United States Patent [19]

McDowell

[11] 4,275,629
[45] Jun. 30, 1981

[54] SEPARATOR-CUTTER

[75] Inventor: Jerry T. McDowell, Greenville, Tenn.

[73] Assignee: Ball Corporation, Muncie, Ind.

[21] Appl. No.: 60,531

[22] Filed: Jul. 25, 1979

[51] Int. Cl.³ .......................... B23D 25/12; B26D 1/56
[52] U.S. Cl. .................................... 83/302; 83/37;
83/303; 83/343; 83/346; 83/408; 83/423;
83/920; 83/903
[58] Field of Search .................. 83/37, 303, 343, 346,
83/423, 302, 300, 920, 408, 903

[56] References Cited

U.S. PATENT DOCUMENTS

| | | | |
|---|---|---|---|
| 463,916 | 11/1891 | Peterson | 83/343 |
| 1,831,422 | 11/1931 | Otis | 83/302 |
| 3,555,948 | 1/1971 | Olson | 83/346 X |
| 3,578,761 | 5/1971 | Sarka | 83/343 |
| 3,709,077 | 1/1973 | Trogan et al. | 83/674 X |
| 3,981,213 | 9/1976 | Lopman | 83/346 |

*Primary Examiner*—Donald R. Schran

*Attorney, Agent, or Firm*—Gilbert E. Alberding

[57] ABSTRACT

Individual battery grids are effectively cut from a continuous sheet of expanded and pasted grid stock by the method and apparatus herein disclosed. The apparatus includes a first rotatably mounted cylinder having a cutting pattern including first cutters lying transverse to the longitudinal axis of the first cylinder and cutting knives spaced from each other and from the first cutters and lying parallel to the longitudinal axis of the first cylinder, and a second rotatably mounted cylinder spaced from the first cylinder and having second cutters cooperating with the first cutters to cut lengthwise of said sheet, the second cylinder having anvil members secured along the periphery thereof and disposed to come into substantial alignment during rotation adjacent the cutting knives and spaced therefrom to make contact therewith, the surface hardness of the cutting knives and the anvil members having a value on the order of at least 55 on the Rockwell C scale, said cutting knives and anvil members cooperting together to sever the sheet.

1 Claim, 5 Drawing Figures

SEPARATOR-CUTTER

BACKGROUND OF THE INVENTION

This patent application is related to my copending patent application Ser. No. 949,938, filed Oct. 10, 1978 now U.S. Pat. No. 4,241,629.

This invention relates to methods and apparatus for cutting a continuous expanded lead battery grid structure and finds adaptation in the battery grid industry, and in particular, relates to the formation of individually pasted battery grid structures produced therefrom.

The subject invention specifically is addressed to the manufacture of individual storage battery grids having active material embedded within the grid network thereof. Such grid structures are generally made by expanding a metal sheet to form an open network structure and thereafter applying paste thereto by means readily available in the art.

Cutting and separating devices of the drum or roller type, and particularly web cutting machines, are known in the art and generally comprise two adjacent cylindrical rollers, one of the rollers having a knife blade protruding therefrom which contacts or nearly contacts the other roller when the roller containing the knife blade is rotated, a web to be severed being disposed between the two rollers. Also known to the art are rotary die cutting devices composed of a cutting roller and an anvil roller. Cutting elements known as cutting rules are mounted on the cutting roller for rotation therewith. The anvil roller is provided generally with a cover known as a blanket which fits around the surface of the anvil roller. The axes of rotation of the cutting roller and the anvil roller are parallel and displaced by an amount such that at their points of closest proximity the cutting rules penetrate the surface of the blanket.

Such devices of the nature with which the present invention is concerned have readily apparent difficulties in properly cutting and separating composite structures composed of sundry unrelated materials of varying degrees of resistance to cutting or shearing characteristics. In the case of cutting completely through a battery grid prepared by conventional operations, the separator-cutter device must effectively cut through metal that has been pasted as well as through at least two webbing materials such as paper and the like. This latter material in conjunction with the others often presents a difficult matter to properly and consistently sever in battery grid manufacture. Admittedly, it is important that a good, clean cut be made on a moving workpiece without interrupting the movement of the workpiece. This must be accomplished many times in a commercial setting.

Periodically, the knife blades or cutting edges must be replaced in order to maintain maximum use of the power loading factors on the cutting machine and to produce a clean shear edge on the workpiece. Longer life and ease of replacement of the cutting edges on the blades are desired goals if they produce a minimum of expense in returning the blade cutting edge to its original condition.

In a way of general background a conventional battery grid is made by a series of steps consisting of (1) expanding a metal strip, (2) flattening and sizing the expanded strip, (3) pasting and papering, (4) drying, (5) cutting and separating the pasted, paperbound strip to form grid structures and (6) enveloping the grid by folding a separator around and sealing the same.

The step of expanding in the process to form the expanded structure may be readily made by conventional processes, such as disclosed in U.S. Pat. No. 3,891,459. After expansion, pasting of the expanded structure is accomplished by moving it into a zone where an active material, generally a thick, lead-containing paste, is applied to the grid network. Various means may be used to apply the active material to the expanded structure. In order to deliver a uniform charge for distribution upon and into the open network of the grid without materially deforming the same, pasting machines are utilized and are generally of the so-called Lund or fixed orifice type or the Winkel or belt type. In the Lund type, a strip of battery paste is fed between a pair of rollers rotating to apply pressure to the grid, the paste being thereby forced into the grid structure. In the Winkel belt type, the grids are fed horizontally on a belt under a roller where the battery paste is applied. Pasting machines have also been developed that use ultrasonic energy to convert battery pastes from their normally nonflowable form to a flowable form. After the expanded structure is subjected to the direct and continuous charge of paste, the pasted grid is moved into a wiping or leveling zone where a doctor blade or the nip of a set of spaced apart rollers produce a uniform paste distribution. Generally, the pasting requires in conjunction therewith the laying down on paper on a continuous belt and passing it to the paste dispensing device and thereafter covering it with a second layer of paper followed by rolling. In this fashion the paste is compressed by mechanical forces into the interstices of the network, the leveling being such as to merely allow the grid structure itself to freely pass through the zone and undergo only minimum, if any, deformation. Thereafter, the pasted, paperbound grid is subjected to a drying operation to thereby affix the paste to the network. In a commercial operation, the production of grids is generally made from a large length of sheet material so that there are a multiplicity of grid structures thereon comprising expanded and unexpanded portions. After drying, the structures must be subjected to a separation or cutting operation to sectionalize and set free the individual grids for further processing. Since such structures are more or less in a delicate state, any slitting or cutting must be carefully done so as not to cause loss of paste from the pasted network. It will be appreciated that the battery grids are easily deformable and may lose their character if adequate means are not employed to handle them. Any undue treatment would cause disruption or loss of paste and, therefore, rejection of the grid structure.

Doughty, U.S. Pat. No. 2,609,945 discloses a battery plate feeding device that employs shearing discs to cut battery grid structures from a moving strip.

Huffman, et al., U.S. Pat. No. 3,310,438 discloses lead battery grid manufacture where expanded portions of a grid are pasted and thereafter subjected to blanking rolls whereby they are cut into finished grids.

Daniels, Jr., U.S. Pat. No. 3,867,200 discloses a method and apparatus for making battery grids in a continuous process including applying an active paste material to the grids, sandwiching the pasted grids between strips of paper and finally segmenting or cutting the pasted strips into individual battery plates.

Briefly, in accordance with this invention, an apparatus for cutting individual battery grids from a continuous sheet of pasted grid stock sandwiched between overlying and underlying webs comprising a first rotatably mounted cylinder having a cutting pattern including first cutter means lying transverse to the longitudinal axis of said first cylinder and cutting knives spaced from each other and from said first cutter means and lying parallel to the longitudinal axis of said first cylinder, and a second rotatably mounted cylinder spaced from said first cylinder and having second cutter means cooperating with said first cutter means to cut lengthwise of said sheet, said second cylinder having anvil members secured along the periphery thereof and disposed to come into substantial alignment during rotation adjacent said cutting knives and spaced therefrom to make direct contact therewith, the surface hardness of said cutting knives and said anvil members being different, said cutting knives and anvil members cooperating together to sever the sheet including the overlying and underlying webs.

The aforementioned features with the objects and advantages which become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

An example of the invention is illustrated in the accompanying drawings in which.

SUMMARY OF THE INVENTION

It has been found in accordance with this invention that a rather unique yet simplistic design and construction afford a highly useful means for cutting and sectionalizing a sheet or web material of pasted grid structures with an attendant feature of maintaining the integrity of each grid thereof.

It is accordingly an object of the present invention to provide a cutting device having a few functional parts and of unitary and economic construction.

It is another principal object of the invention to provide a device of the character herewithin described which has means for cutting a continuous strip of expanded webbound material transversely and longitudinally of said material for use in conventional battery manufacturing operations.

It is still another object of this invention to provide means for a commercial, lead-base battery facility, the means providing proper formation of individual battery grid structures having pasted webbound portions thereon.

An object of the subject invention is to provide an apparatus for cutting and separating battery grid structures from a continuous, paperbound sheet material from a pasting machine without fracturing the grid structure or loosening the active paste therefrom.

Another object of the instant invention is to provide a device having rotary cutting means with cooperating anvil plates for effecting a selected cut pattern completely through a multilayered material, especially an expanded metal strip having webbing layers therethrough.

Another object of the instant invention is to provide a novel cutting rule of unique design and characteristic that in conjunction with prescribed anvil members effectively shear a composite structure.

These and other objects of the invention will become more readily apparent from a review of the specification and claims and a study of the attached drawings.

DETAILED DESCRIPTION OF THE INVENTION

Figure 4:
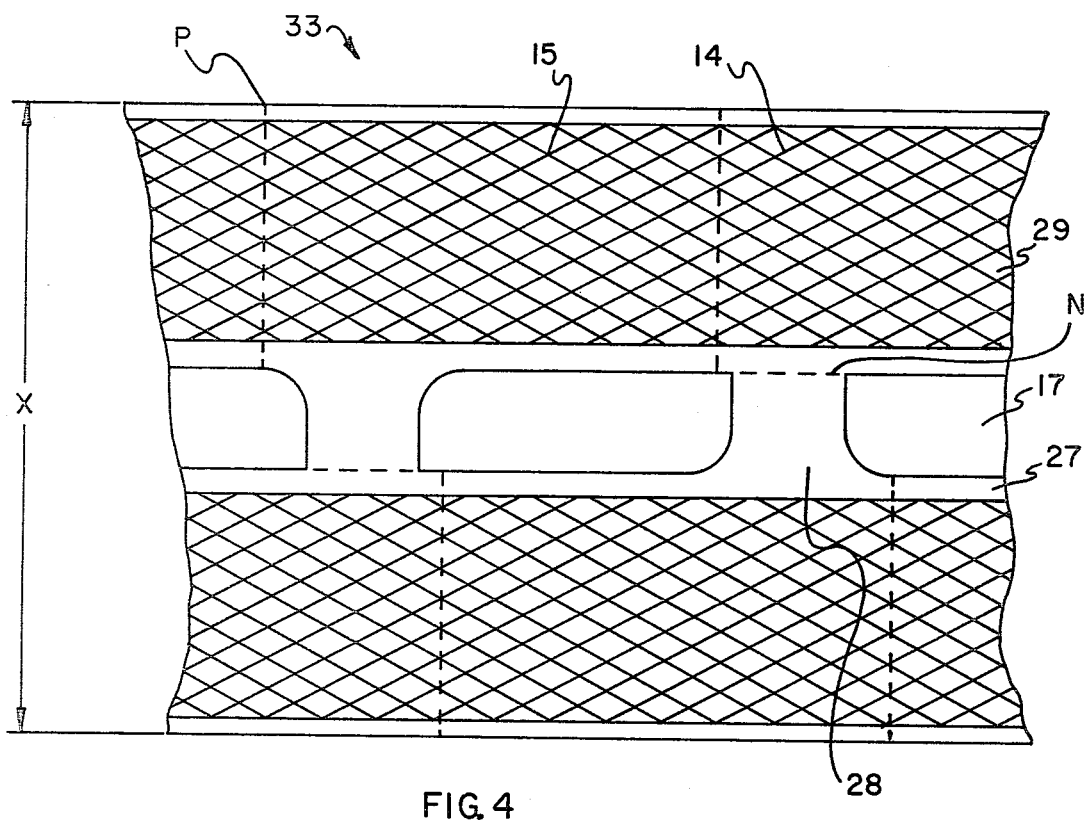
FIG. 4 is a plan view of unsectionalized grid structures.

Referring now more particularly to the accompanying drawings, 10 indicates generally a conventional battery grid line along with the essential features of the instant invention. The grids are made initially from an unexpanded metal strip 11 of metal, such as lead or lead-base alloys, drawn from a pay off roll 12 and is conveyed to a conventional expanding machine 13 in which the strip 11 is expanded to form a grid structure 33 by reciprocating slitting and expanding cutter (not shown), the strip itself being advanced step by step lengthwise into the machine. Generally, the expanding machine 13 has its cutter situated to converge on the center of the strip in the direction the strip is advanced. There results from such an expansion operation the grid structure 33 having an open network comprising a plurality of skeletal, wire-like elements 14 (FIG. 4) connected one to the other by nodes 15, each node 15 and elements 14 extending diagonally through the grid structure in a more or less honeycomb fashion.

Following expansion, the expanded strip 33 is laid down into substantially the same plane as the original unexpanded strip 11 from which it was formed by advancing the strip 33 through leveling rollers 18 located near the exit end of the expanding machine 13.

After leveling of the expanded strip, the strip is fed by spaced apart drive means 16 into a scrap removal and flattening die apparatus 23. In this operation a cut out section 17 is formed and the pieces so cut out are removed from the strip, this being readily accomplished by a punch and die arrangement (not shown) for the specific cut out configuration desired. At the same time the expanded strip 33 is subjected to this cut out operation, the grid structure is likewise flattened to a fixed, predetermined grid thickness and the elements are turned or rotated to a desired angular moment. Moreover, the flattening die is so designed that during the flattening operation, the strip is confined to a specified dimension indicated as x in FIG. 4 and, therefore, the grid strip is perfectly sized to a predetermined width.

After removal of the scrap portion with flattening and sizing thereof, the grid strip is conveyed to the next operation and is there ready for pasting via pasting machine 34. The pasting machine may be flush pasted or belt pasted using conventional pasting techniques as is well-known in the art. Prior to dispensing the paste, a single layer of paper 45, generally perforated, is laid down under the grid strip. After pasting, another strip of paper 46 is placed over the pasted grid followed by pressing via rolls 47 and 48 the paperbound structure so that the paste is spread throughout the expanded portions of the grid. The pasted grid structure may thereafter be cured or dried by a conventional drying oven 19. The dried grid structure is then advanced to the separator-cutter 22 device of the subject invention.

Figure 1:
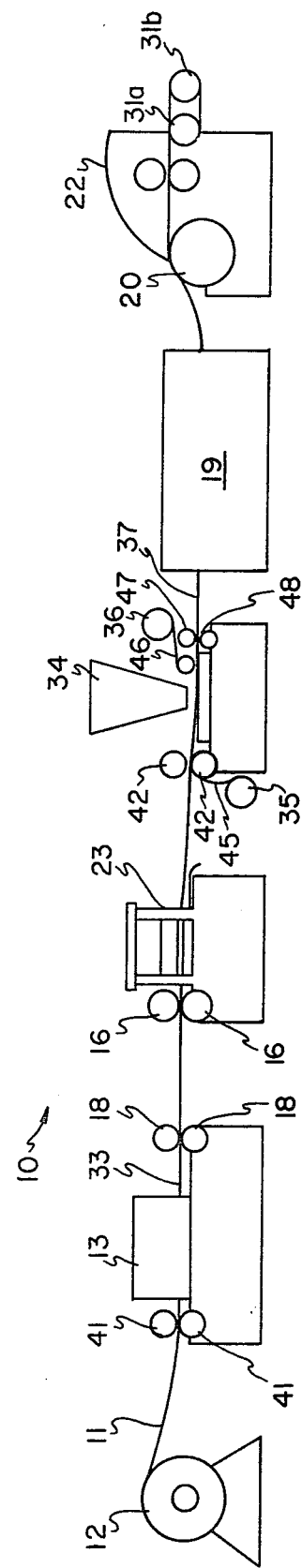
FIG. 1 is a schematic flow diagram.
Figure 2:
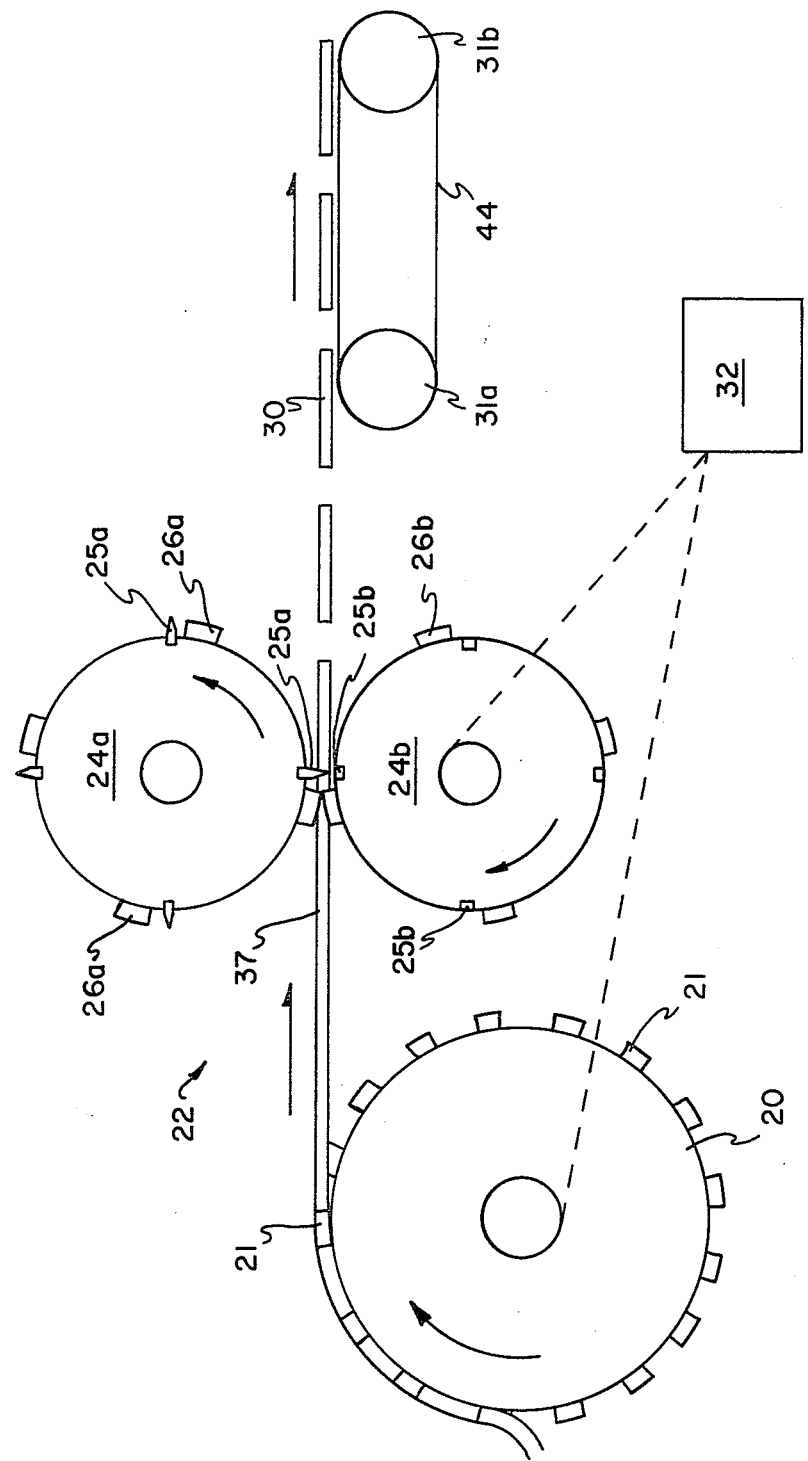
FIG. 2 is an enlarged, front elevational view of the subject devices.

It will be noted from FIG. 2, which is a more detailed drawing of the cutting apparatus of the subject invention, that the apparatus comprises a feed wheel 20 upon which passes the dried grid structure 37, said structure engaging drive lugs 21 affixed to said feed wheel 20. Then the drive lugs engage the cut out portions of the strip and advance the strip directly in the cutting device 22. The surface speed for the roller should be adjusted so that its surface speed equals that of the feed wheel.

Figure 3:
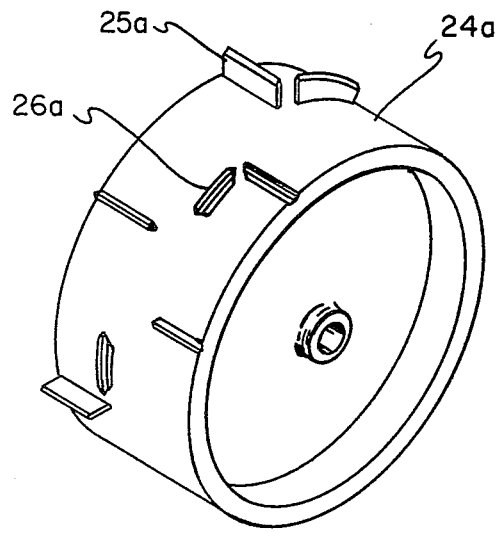
FIG. 3 is a view of one of the subject cutting tools.

The separator-cutter 22 comprises a first cylinder 24a and a second cylinder 24b mounted for rotation about mutually parallel axes. The separator-cutter 22 comprises a plurality of radially extending cutters 26 secured to an upper and lower cylinder 24a and 24b, respectively. In FIG. 2, four cutters 26a are shown on upper cylinder 24a and four cooperating cutters 26b are shown on lower cylinder 24b. The cutters are so affixed to the upper cylinder 24a with corresponding cutters 26b in the lower cylinder 24b, the cutters situated transverse to the roller axis and being spaced from each other in a more or less staggered fashion as best shown in FIG. 3. As clearly further seen in the drawing the upper cylinder 24a is also provided with cutting knives 25a situated parallel to the longitudinal axis and spaced apart from each other. In substantial alignment with the aforementioned cutting knives 25a are corresponding anvil members 25b secured to the periphery of the lower roller. The cutting knives 25a are so arranged that they come into direct contact with the anvil members 25b upon rotation. Of course, the cylinders 24a and 24b themselves are mounted via shafts (not shown) whereby a conventional motor 32 may be used to drive them.

It has been found critical in the subject invention that the cutting knives that are parallel to the longitudinal axis of the cylinder have a surface hardness in excess of a Rockwell hardness of 55 on the C scale. Further, the anvil members associated therewith should have an equal hardness or a hardness different from that of the knives. In general, it has been found advantageous when there is some degree of difference in surface hardness between the cutting knives 25a and the anvil members in order to effectively cut and separate the grid structures. It has been found that when the surface hardness is too low (below about 55 Rockwell C) that cutting of the webbound grid was difficult since the web or paper material resisted cutting but when the respective surfaces hardnesses were equal or different yet not below 55 there was ease of cutting the complete grid structure. In this regard, it was found that if the cutting knife is between about 55 to 65 Rockwell hardness C, preferably about 62, and the anvil member has a Rockwell hardness on the C scale of between about 50 to 65, preferably about 58, that excellent and prolonged through-cutting are achieved.

Figure 5:
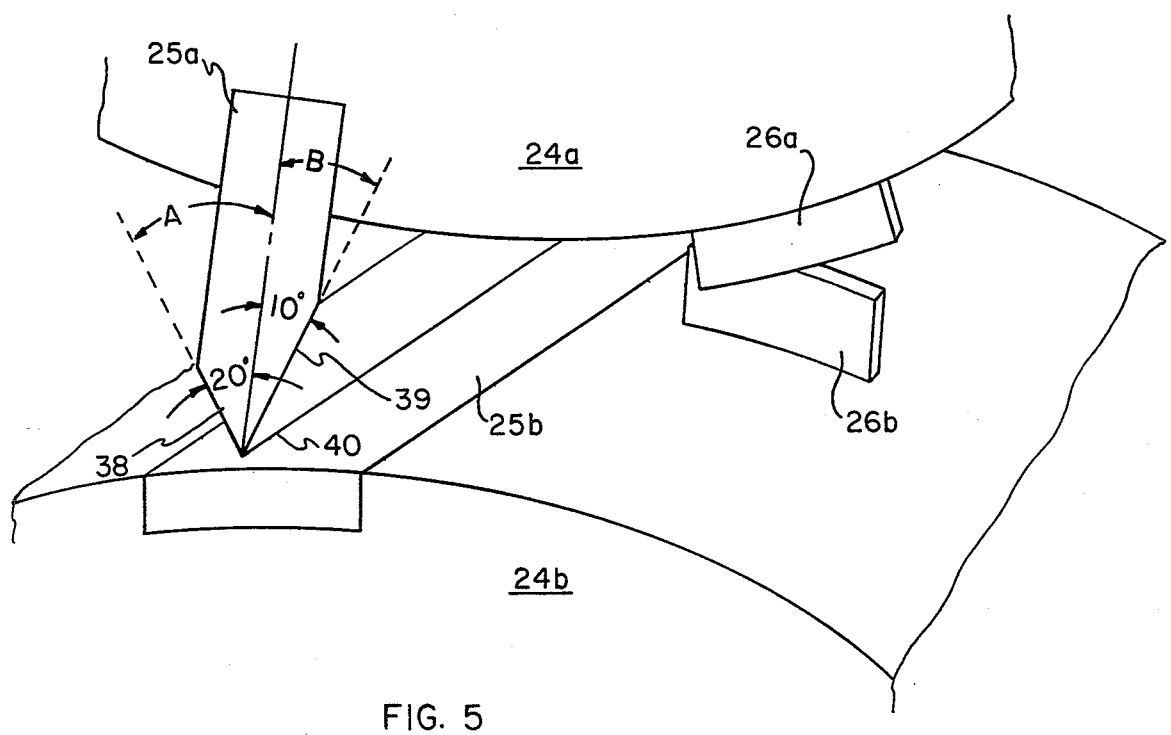
FIG. 5 is an elevational view of the cutting knife after this invention.

FIG. 5 depicts a cutting blade in accordance with the subject invention. It is noted that the blade 25a has a leading terminating face 38 and a trailing terminating face 39. It has been found that good through-cuts are achieved when the leading face 38 has an angle of about 20°±2° and the trailing face 38 has an angle of about 10°±2° from the vertical. From such a configuration the cut is complete and results in square surfaces.

In operation, after the expanded grid has been punched, pasted and dried, it is advanced to the separation area which comprises the feed wheel and the rotary cutting apparatus. The grid is advanced to the feed wheel whereon the cut out portions of the grid strip are taken up by a series of lugs affixed to the feed wheel. Thereafter, the grid strip is conveyed along a belt positioned adjacent to the feed wheel to accept the strip and adapted to travel at a predetermined speed. Upon leaving the conveyor the strip passes into the nip of the separator-cutter. The arrangement of the cutting members is such that alternate cuts are inflicted upon the strip during its travel and are made from the peripheral of the strip toward the void or cut out portion (designated P in FIG. 4) of the strip with subsequent cutting concurrently taking place longitudinally between cut out sections (designated N). In this fashion the grid structures are separated from the strip in a continuous manner and are taken up by a second conveyor into a stacking area.

It is advantageous if the cutters and blades are made of high quality steel and that they be removably secured to their respective cylinders for ease of repair or change. A preferred steel for the blade and anvil members is one having a composition comprising carbon 0.85–0.95, manganese 1.00–1.25, silicon 0.15–0.35, chromium 0.40–0.60, tungsten 0.40–0.60, vanadium 0.15–0.25 and the remainder iron.

The preferred form of grid structure made in accordance with this invention is an individual structure 30 formed from an expanded lead-base metal strip and provided with a header 27 and a lug portion 28 of an unexpanded metal strip and an open network portion 29 of expanded metal, the open network being defined by wire-like elements 14 which have been pasted and sectionalized as aforementioned. The grid structure resulting from the separator-cutter device herein disclosed is square in cut and has no sharp corners that would affect the overall performance characteristics of the grid in a battery.

It should be mentioned that the subject device may cut undried strip as well as dried strip. Thus, although the step of drying may be carried out right after pasting, it has also been found advantageous to cut via the separator-cutter herein described and thereafter dry the individual grid structures. It should be appreciated that the subject apparatus can readily effect clean, square cuts on wet or dry stock.

It is believed that a careful consideration of the specification in conjunction with the means of the drawings will enable the reader to obtain a clear and comprehensive understanding of the subject matter of the invention, the features and advantages, mode of use and improved result which is assured the user.

The foregoing is considered as illustrative only of the principles of the invention. Further, since a number of modifications and changes will readily occur to those skilled in the art, it is not desired to limit the invention to exact construction shown and described, and accordingly all suitable modifications and equivalents may be resorted to, falling within the scope of the invention as claimed.

What is claimed is:

1. An apparatus for cutting individual battery grids from a continuous sheet of pasted grid stock having an overlayer and underlayer of webbing material including paper comprising a first rotatably mounted cylinder having a cutting pattern including first cutter means lying transverse to the longitudinal axis of said first cylinder and cutting knives spaced from each other and from said first cutter means and lying parallel to the longitudinal axis of said first cylinder, each cutting knife having two adjacent cutting faces terminating into the cutting edge thereof, the angular slope of said cutting faces is about 20° for the leading edge and about 10° for the trailing edge thereof, and a second rotatably mounted cylinder spaced from said first cylinder and having second cutter means cooperating with said first cutter means to cut lengthwise of said sheet, said second cylinder having anvil members secured along the periphery thereof and disposed to come into substantial alignment during rotation adjacent said cutting knives and spaced therefrom to make direct contact therewith, the surface hardness of said cutting knives and said anvil members being different, said cutting knife being between about 55 to 65 Rockwell hardness on the C scale and said anvil members having between about 50 to 65 Rockwell hardness on the C scale, said cutting knives and anvil members cooperating together to sever the sheet including the overlayer and underlayer of webbing material including paper.

* * * * *